United States Patent [19]

Berlad

[11] Patent Number: 5,444,253
[45] Date of Patent: Aug. 22, 1995

[54] GAMMA CAMERA EVENT LOCATION SYSTEM

[75] Inventor: Gideon Berlad, Haifa, Israel

[73] Assignee: Elscint Ltd., Haifa, Israel

[21] Appl. No.: 177,337

[22] Filed: Jan. 4, 1994

[51] Int. Cl.⁶ ............................................. G01T 1/164
[52] U.S. Cl. .................. 250/369; 250/363.07
[58] Field of Search ............................ 250/369, 363.07

[56] References Cited

U.S. PATENT DOCUMENTS

| | | | |
|---|---|---|---|
| 3,011,057 | 11/1961 | Anger | 250/366 |
| 3,745,345 | 7/1973 | Muehllehner | 250/363.01 |
| 4,095,108 | 6/1978 | Inbar et al. | 250/369 |
| 4,424,447 | 1/1984 | Lelong et al. | 250/363.07 |
| 5,285,072 | 2/1994 | Klingenbeck-Regn et al. | 250/369 |

FOREIGN PATENT DOCUMENTS 0450388  10/1991  European Pat. Off. ............ 250/369

*Primary Examiner*—Constantine Hannaher
*Attorney, Agent, or Firm*—Sandler, Greenblum & Bernstein

[57] ABSTRACT

A gamma camera that iteratively determines corrected X, Y coordinate locations of events based on optimizing an event location function for each PM using the distance between the event and the PM's.

18 Claims, 2 Drawing Sheets

GAMMA CAMERA EVENT LOCATION SYSTEM

FIELD OF THE INVENTION

This invention is concerned with gamma cameras and more particularly with systems and methods for locating events where an event is the impact of a gamma radiation on a scintillator causing a scintillation.

BACKGROUND OF THE INVENTION

Most gamma cameras presently use what is known as Anger mathematics or Anger calculations, as shown in U.S. Pat. No. 3,011,057 to determine the location of the event at what may be termed a first approximation. Subsequently correction factors are used to correct the Anger calculation determined location.

Correction factors include, for example, dislocation correction factors obtained by using a flood field in conjunction with a gamma radiation shield having perforations therein at known locations. Correction factors are computed for determining the distance between the known locations of the perforations and the image locations of the perforations. These calculations are used for correcting the locations of the events as they occur during the clinical use of the gamma camera.

In practice it is advisable to recalibrate the correction factors periodically; that is, to perform the flood field dislocation calibration scheme periodically because the previously obtained dislocation correction factors are no longer accurate due to drift in the hardware components. Accordingly, the correction factors while presumed correct at the beginning of the periodic term, eventually become relatively incorrect unless the electronics are "retuned".

In addition to the inconvenience, the dislocation correction calibration takes time and equipment. Further the actual dislocation correction, while done on the fly, still requires a memory for storing the correction factors and a mathematic performing unit to do calculations utilizing the correction factors. Hence the need to recalibrate requires more hardware and/or software in the gamma cameras. Since the widespread adaption of the Anger camera calculation systems, other means and methods have been sought to obtain a more accurate method of precisely locating events as they occur.

Statistical methods have been suggested for locating the events on the gamma camera for imaging purposes. However in the past these statistical methods have required vast memories, intensive computation and extra equipment for the actual calculations; so that, the statistical methods have proved impractical.

BRIEF DESCRIPTION OF THE INVENTION

In accordance with a broad aspect of the present invention a gamma camera is provided having a new and improved event location system incorporated therein said gamma camera with the event location system comprising:

- a scintillator crystal which scintillates responsive to the impingement thereof by radiation,
- a plurality of photomultiplier tubes (sometimes referred to as PMs hereinafter) for generating electrical signals responsive to scintillations (also called light events),
- said system having PMs with output curves that are approximately radially symmetrical in response to light events detected by the PMs,
- computer circuitry operated responsive to said electrical signals for determining the uncorrected location of the detected events and the energy of the detected event;
- said computer circuitry for determining the uncorrected location and the energy of the event further comprising:
  1) an estimator for estimating the X, Y location of the event;
  2) an expectation value calculator using the estimated X, Y location of the event relative to locations of each of the PMs for analytically determining an expectation value of the energy output from each of the PMs responsive to said event based on the location of each of the PMs relative to the event;
  3) an X, Y location definer operated responsive to said determined expectation value for setting up an event location optimization function to define the X, Y location of the event relative to the location of each of the PMs;
  4) and an iteration loop using the event location optimization function for iteratively determining the corrected coordinates $X_c$, $Y_c$ of the event.

BRIEF DESCRIPTION OF THE DRAWINGS

The above named and other features and objects of the present invention will be best understood when considered in the light of the following description of a broad aspect of the present invention taken in conjunction with the following drawings, wherein.

GENERAL DESCRIPTION

To operate the system a plurality of fixed look-up tables must be provided. The look-up tables are used to show measured items such as the X and Y locations of the center of each of the photomultipliers; indicated generally as $X_f$, $Y_f$. The look-up tables also contain computed items such as the expectation value $a_i$ of the energy output of each photomultiplier $PM_i$ and the differential of the natural log of the expectation value indicated as B(u) which is the differential of the log natural of the expectation value a(u) with respect to du.

Figure 1:
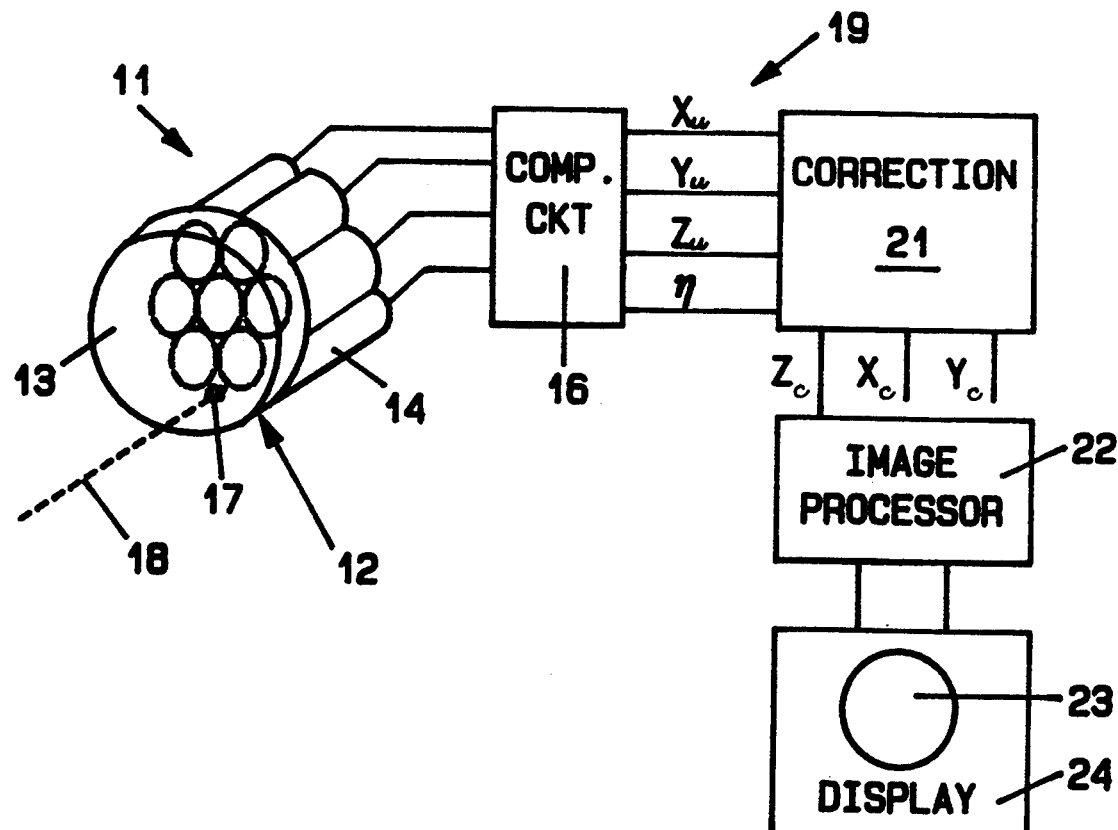
FIG. 1 is a perspective partial view of a gamma camera head along with a block diagram showing of the computation and image processing circuitry that results in the displayed image.

FIG. 1 shows a basic gamma camera system. The nuclear medicine imaging system 11 of FIG. 1 comprises a gamma camera head 12 including a scintillating crystal 13 and a plurality of photomultiplier (PM) tubes such as PM 14. Computation circuitry 16 is provided which determines the uncorrected coordinate location of each event $X_u$, $Y_u$. An event is defined as a scintillation indicated at 17, for example, caused by the impingement of the crystal 13 by a gamma photon moving along path 18 shown by the dashed line. The computation circuit 16 also determines the measured total energy $Z_u$ of the event. Thus the computation circuit provides uncorrected values of $X_u$, $Y_u$ and $Z_u$ at its output 19.

As is well known, the location coordinates $X_u$, $Y_u$ obtained from the computation circuit 16 are influenced by the location of the event relative to the PM's. Accordingly the coordinates are in error as is the measured energy $Z_u$. Modern gamma cameras correct the coordinates determined by the computation circuit in a manner similar to that taught by U.S. Pat. No. 3,745,345. The measured energy is corrected as a function of the location of the event in a manner first taught in U.S. Pat. No. 4,095,108.

As noted in the beginning of this description the location corrections of the prior art are faulty in that among other things they require periodic calibration. The correction circuit 21 overcomes the faults of the prior art location correction circuits. The correction circuit 21 analytically determines the expected value of the energy from each of the photomultipliers based on the location of the event relative to each of the PM's. A location optimization function is set up which defines the X, Y locations of the events. The defined X, Y locations are subjected to an iteration loop to finally determine the corrected $X_c$, $Y_c$ coordinates. These corrected coordinates are used by the image processor 22 to provide the display on monitor 24.

The measured information acquired from the camera includes the measured energy content ($Z_i$) of the event at each PM. More particularly $Z_i$ is the energy at the output of each PM which is a function of the energy input from the event and the locations of the photomultiplier relative to the location of the event. The gamma camera measures the energy output of each photomultiplier tube $Z_i$ as indicated in block 26 of FIG. 2 which indicates the measurement $Z_i$ as applying to PMs 1, 2. . .n. The measurements of $Z_i$ are summed, i.e. the summation of the energy outputs of the photomultipliers is obtained which is the total measured energy of the event. The proportion of the measured energy per photomultiplier tube relative to the total measured energy is designated as $n_i$ and is indicated in block 27.

Block 28 shows an exemplary calculation of the X, Y coordinates of the events. This calculation is the known Anger calculation. The calculation determines the uncorrected $X_u$ and $Y_u$ coordinates of each event. For example $X_u$ is the summation of each $X_i$ and $n_i$ and $Y_u$ is the summation of each $Y_i$ and $n_i$, where $X_i$ and $Y_i$ are the coordinate locations of each PM which is obtained from the look-up tables, i.e. from the look-up table No. 1.

Figure 2:
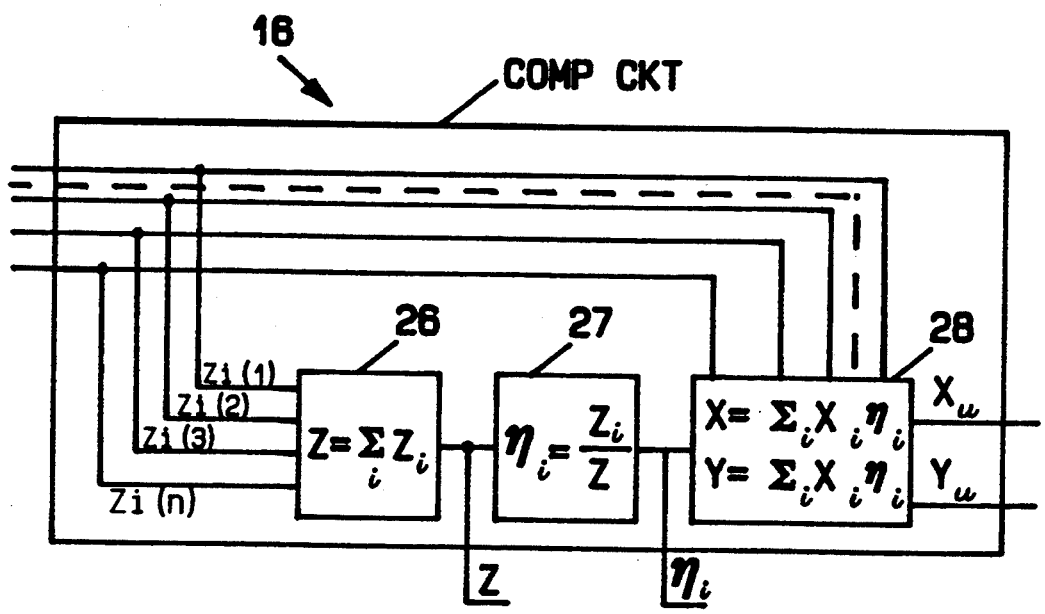
FIG. 2 is a more detailed showing of the computation circuit.

What has been described up to now relating to FIGS. 1 and 2 from block 12 through block 28 could be the normal Anger calculation performed by all gamma cameras of the Anger variety. Most gamma cameras presently in use are Anger type cameras. The actual mathematical basis of the location correction system described herein assumes a radial symmetry of the photomultiplier curves.

By definition ($X_i$, $Y_i$) are the coordinates of the center of the PM numbered $i$ and $n_i$ is the normalized energy output of the PM number $i$. The radially symmetrical PM curve $a_i$ is defined as the expectation value of the energy $n_i$, or $a_i = E(n_i)$. By assuming $a_i$ to be radially symmetrical it follows that:

$$a_i(X, Y) = a_i(u_i) \text{ where: } u_i^2 = (X-X_i)^2 + (Y-Y_i)^2$$

The location of the event is estimated by letting M ($n_1$, $n_2$. . .; $a_1$ $a_2$. . .) be an event-location optimization (maximization) function, i.e. the extreme conditions:

$$\frac{\partial M}{\partial X} = O; \frac{\partial M}{\partial Y} = O$$

define the most probable location (X, Y) of an event. From the definition of M and $a_i = a(u_i)$ we get $$O = \frac{\partial M}{\partial X} = \Sigma \frac{\partial M}{\partial X_i} \cdot \frac{\partial X_i}{\partial U_i} \cdot \frac{\partial U_i}{\partial X}$$

Since:

$$\frac{\partial u_i}{\partial X} = 2(X - X_i)$$

we can rewrite the event location equation as:

$$O = \frac{\partial M}{\partial X} = 2\Sigma (X - X_i) \cdot W_i;$$

or $$O = \frac{\partial M}{\partial Y} = 2\Sigma (X - X_i) \cdot W_i$$

where $$W_i = \left( a_i \frac{\partial M}{\partial a_i} \right) \frac{d}{du_i} (\ln a_i)$$

Finally:

$$X = \Sigma X_i W_i / \Sigma W_i$$

and in a similar manner:

$$Y = \Sigma Y_i W_i / \Sigma W_1$$

The last two equations indicate the following simple iterative method to obtain the most probable estimate for the correct event location ($X_c$, $Y_c$).

(a) Prepare look-up tables for a(u) and B(u) where:

$$\beta(u) = \frac{d}{du} \ln \alpha(u)$$

(b) Given an event that generates the PM output $\{Z_i\}$; calculate the uncorrected event location coordinates $X_u$, $Y_u$; for example, use "Anger arithmetic":

$$X_u = \Sigma X_i n_i; Y_u = \Sigma Y_i n_i; n_i = Z_i / \Sigma Z_i$$

(c) Use the uncorrected coordinate locations ($X_u$, $Y_u$) to calculate $u_i$:

$$u_i^2 = (X_u - X_i)^2 + (Y_u - Y_i)^2$$

(d) Using the $a_1$ and $B_i$ look-up tables, calculate:

$$W_i = \left( d_i \frac{\partial M}{\partial a_i} \right) \beta_i$$

(e) Calculate the next estimate of (X, Y):

$$X = \Sigma X_i W_i / \Sigma W_i; Y = \Sigma Y_i W_i / \Sigma W_i$$

(f) Repeat (c) to (e) until convergence is obtained. The method can be readily applied to Maximum Log Likelihood:

For Maximum log likelihood:

$$M = \ln\left[\pi \frac{\alpha_i^{\eta_i}}{\eta_i!} e^{-\alpha_i}\right]$$

$$= \Sigma \left[\eta_i \ln \alpha_i - \alpha_i - \ln(\eta_i!)\right]$$

Thus:

$$\alpha_i \frac{\partial M}{\partial \alpha_i} = \alpha_i \left[\frac{\eta_i}{\alpha_i} - 1\right] = \eta_i - \alpha_i$$

and consequently, $$W_i = (\eta_i - \alpha_i) \frac{d}{du}(\ln \alpha_i)$$

$$= (\eta_i - \alpha_i) \beta_i$$

Figure 3:
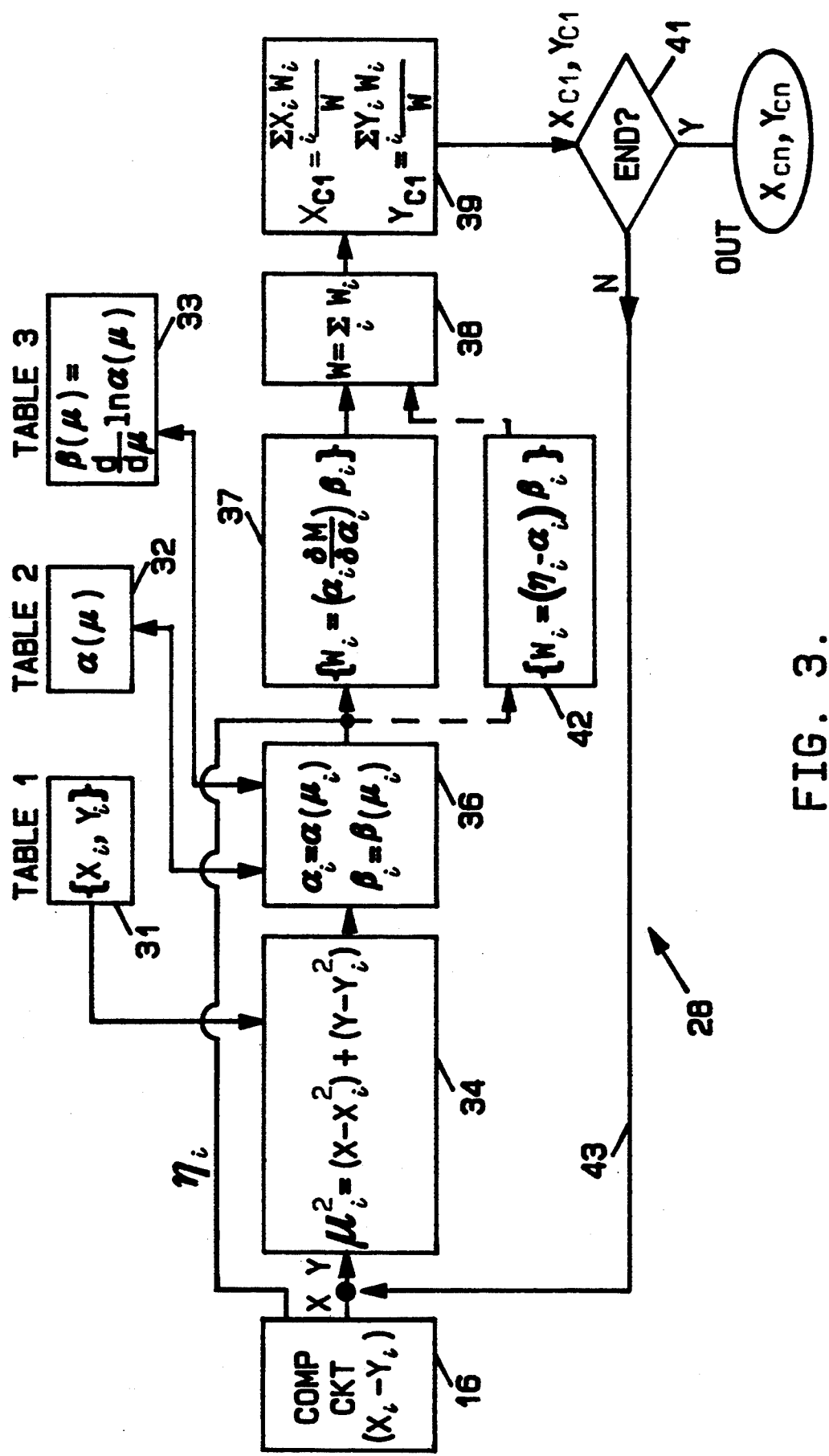
FIG. 3 is an embodiment of an iteration loop used for location correction in the corrector block of FIG. 1.

FIG. 3 illustrates the equipment needed for the above event location method in detail. It is seen that the uncorrected $X_u$ and $Y_u$ values received from the computer circuit 16 are now used to obtain $u_i^2$; that is, the vector location of the event relative to each photomultiplier tube. More particularly this value $u_i^2$ is equal to $(X-X_i)^2 + (Y-Y_i)^2$.

As shown in FIG. 3 the computation circuit 16 provides the uncorrected coordinates of the event $X_u$, $Y_u$ and the normalized energy i.e., $Z_i/\Sigma Z_i$ or $n_i$. Look-up table I indicated at block 31 is used to provide the known values of the coordinates $X_1$, $Y_1$ which is the location of each of the PM's. Look-up Table II indicated at block 32 provides the expectation value a(u) of the energy $n_i$ for each PM relative to the uncorrected location of the event $X_u$, $Y_u$. Table III indicated at 33 gives the values of the differential of the natural logarithm of the radially symmetrical curve $a_i$ for each PM.

Block 34 computes the distance (u) from the center of the $PM_1$ to the event using the uncorrected $X_u$, $Y_u$ coordinates of the event. Block 36 indicates the expectation value a of the energy of each PM and $B_i$ the natural log of the expectation values of each PM are obtained from Tables II and III, respectively. Using the value of $u_i^2$ obtained from Block 34, Block 37 shows that for each PM an energy weight $W_i$ is obtained. The energy weight $W_i$ is the product of the differential of the event localization optimization function M with respect to the expectation value of the energy $n_i$ for $PM_i$ multiplied by the expectation value of the energy for $PM_i$ and further multiplied by the differential of the natural log of the expectation value of the energy ln $a_i$ of the $PM_i$ with respect to the distance of the $PM_i$ from the event. Block 38 shows that the energy weight $W_i$ for each PM are all added together to provide a normalization factor W.

The first iteration corrected coordinates $(X_{ct}, Y_{ct})$ are then provided by Block 39 using the distances of the PM's from the event $X_i$, $Y_i$ multiplied by the energy weight $W_i$ of $PM_i$ and divided by the normalization factor W.

The coordinates $X_{ct}$, $Y_{ct}$ are then used in place of the uncorrected coordinates $X_u, Y_u$ from computation circuit 16 for the next iteration. When the new corrected coordinates $X_{ca} Y_{ca}$ (where n=2, 3, 4...) produce convergence, as determined in block 41, then the values of $X_{cn}$ and $Y_{cn}$ are the correct values that are used.

Block 42 illustrates a variation of the system. Block 37 defines the general case of the energy value $W_i$ based on a general event location optimization function M ($n_i$, $n_2$...$a_1$, $a_2$...). In a more specific case where a maximum log likelihood approach is used, then equations 12–16 are applicable.

It should be noted that while the Anger computation is shown as being used to obtain a first approximation of the X and Y locations of the event, any other method can be used for obtaining the first approximation of the location. However the Anger computation is preferred since it is readily available and well known.

The value $u_i$, the distance of the event from PM, is then determined as shown in box 34 to be the square root of the sum of the squares of the quantity $(X-X_i)$ and the quantity $(Y-Y_i)$. From the values of $u_i$ obtained from block 34 the values of ai the expectation value of the energy output of each photomultiplier $PM_i$ for such distance $u_i$ is determined. A table of a ($u_i$) can therefore be generated which is universal for each gamma camera. Thus $a_i$ is obtained from the generated look-up table and addressed using the calculated $u_i$ values.

Another look-up table (Table III) provides the value of B(u) which is equal to the differential of the natural log of a(u) for each photomultiplier tube. From the energy expectation values $a_i$, an energy valuation $W_i$ per PM, can then be calculated where $\{W_i=(n_i-a_i)B_i\}$ for all of the photomultipliers in the ensemble. The value W is the value of the summation of all the $W_i$'s for each photomultiplier tube. Using the values of W and $W_i$ and the known values $X_i$, $Y_i$ the corrected coordinate values $X_c$ and $Y_c$ are obtained using the equation:

$$X_{cn} = \Sigma X_i W_i / W \text{ and } Y_{cn} = \Sigma Y_i W_i / W.$$

Either block 37 or block 42 give values $W_i$. The values of the $W_i$'s are used in block 38 to obtain the value of W. The value of $W_i$ is also used in block 39 along with values of $X_i$, $Y_i$ and W to obtain the corrected event coordinate values $X_{cn}$ and $Y_{cn}$.

Another iteration is performed as indicated by the iteration loop 25 when the question of whether to end the iterations and immediately determine $X_c$ and $Y_c$ or not to end is answered as indicated in block 41. The iteration loop conductor 43 is utilized when the answer is No. Then the new corrected $X_{cn}$ and $Y_{cn}$ are used in place of the last corrected $X_c$ and $Y_c$. This provides another answer for $X_{cn}$ and $Y_{cn}$ which is closer to the true answer.

The number of iterations done depends on the purpose of the image. Thus a determination can be made that when the improvement goes down to an insignificant fraction that is the end of it.

Other criteria can be used within the scope of the invention. In practice three or four iterations are more than enough. The equations set forth in the blocks provide a very efficient system for accurately obtaining the corrected X and Y locations of the events without the necessity of using an excessive amount of memory or excessive operating hardware.

Another practical way of obtaining iteratively improved event location estimates from the equations:

$$\Sigma(X-X_1)\bullet W_i = 0; \; \Sigma(Y-Y_i)\bullet W_i = 0$$

implements a Newton-Raphson type iterative method. Let (X, Y) be the previously known event location and $X+\Delta X$, $Y+\Delta Y$) the improved event location. The event location equations will now read:

$$\Sigma(\Delta X+X-X_i)\cdot W_i(X+\Delta X, Y+\Delta Y)=0$$

$$\Sigma(\Delta Y+Y-Y_i)\cdot W_i(X+\Delta X, Y+\Delta Y)=0$$

$W_i$ depends on (X, Y) only via $$u^2=(X-X_i)^2+(Y-Y_i)^2$$

therefore to the first order in $(\Delta X, \Delta Y)$ we get:

$$W_i(X + \Delta X, Y + \Delta Y) \cong$$

$$W_i(X,Y) + 2\cdot\frac{\partial W_i}{\partial u_i}[(x-x_i)\cdot\Delta X + (Y-Y_i)\cdot\Delta Y]$$

This approximation is now substituted into the event location equations and only terms up to and including first order terms in $(\Delta X, \Delta Y)$ are retained. Consequently a set of two coupled linear equations in $(\Delta X, \Delta Y)$ is obtained:

$$S_x+S_{xx}\cdot\Delta X+S_{xy}\cdot\Delta Y=0$$

$$S_y+S_{xy}\cdot\Delta X+S_{yy}\cdot\Delta Y=0$$

Where:

$$S_x = \Sigma(X-X_i)\cdot W_i$$
$$S_y = \Sigma(Y-Y_i)\cdot W_i$$

$$S_{xx} = \Sigma\left[W_i + 2\cdot(X-X_i)^2\cdot\frac{\partial W_i}{\partial u_i}\right]$$

$$S_{xy} = \Sigma 2\cdot(X-X_i)(Y-Y_i)\cdot\frac{\partial W_i}{\partial u_i}$$

$$S_{yy} = \Sigma\left[W_i + 2 - (Y-Y_i)^2\cdot\frac{\partial W_i}{\partial u_i}\right]$$

The solution for $(\Delta X, \Delta Y)$ is:

$$\Delta X = \frac{S_x\cdot S_{yy} - S_y\cdot S_{xy}}{S_{xx}\cdot S_{yy} - S_{xy}^2}$$

$$\Delta Y = \frac{S_y\cdot S_{xx} - S_x\cdot S_{xy}}{S_{xx}\cdot S_{yy} - S_{xy}^2}$$

In general, it is found that the (X, Y) cross-term $S_{xy}$ is small; i.e., $|S_{xy}| << |S_{xx}|, |S_{yy}|$. Hence the cross product term $S_{xy}$ can be omitted.

Thus, dropping the terms with $S_{xy}$, the solution for the event-location improvement $(\Delta X, \Delta Y)$ is reduced to:

$$\Delta X = \frac{-S_x}{S_{xx}}$$

$$\Delta Y = \frac{-S_y}{S_{yy}}$$

The improved location estimate $(X_{cn}, Y_{cn})$ is now given by:

$$X^1 = X + \Delta X$$

$$Y^1 = Y + \Delta Y$$

Where (X, Y) were the previously known events location co-ordinates.

While the invention has been described with regard to a specific embodiment it should be understood that this explanation is by way of example only and not as a limitation on the scope of the invention which scope is provided by the accompanying claims.

What is claimed is:

1. A gamma camera comprising:
   a scintillation crystal that provides an event in the form of a scintillation responsive to impingement on the crystal of radiation,
   a plurality of photomultiplier (PM's) tubes having approximately radially-symmetrical PM-curves mounted on said crystal and operated responsive to said scintillation for generating electrical signals
   a distance computer for computing coordinate and the hypotenuse distances of each of the PM's from each of said scintillations where the coordinates X, Y or the scintillations are estimated and the coordinates of the PM's $X_i$, $Y_i$ are known.
   an energy expectation source providing an energy expectation value ($a_i$) for each PM based on hypotenuse distance of the PM from the event as determined by the distance computer,
   a weight computer to determine a factor to be applied to the summation of the coordinates of the PM's $X_i$, $Y_i$ for providing corrected X, Y coordinate locations of the scintillations, and
   iterative circuitry for repeating using the last corrected X, Y coordinate locations of the scintillations in the distance computer for determining factors that provide X, Y coordinates for the location of the scintillation that are more correct than the last corrected X, Y coordinate location.

2. The gamma camera of claim 1 wherein lookup tables provide system data used in determining the factor.

3. The gamma camera system of claim 2 wherein said lookup tables include:
   a first table that provides the coordinate positions $X_i$, $Y_i$ of each of said photomultipliers,
   a second table that provides an expectation value of normalized energy for each of the photomultipliers, and
   a third table that provides the differential with respect to the hypotenuse distance of the log natural of the expectation value of the normalized energy for each of the photomultipliers.

4. The gamma camera of claim 1 wherein the distance between each of the photomultipliers and the event is determined by the equation:

$$U_i^2 = (X-X_i)^2 + *Y-Y_i)^2$$

where:
   U is the distance between the event and the center of the photomultiplier tube;
   $X_i$ and $Y_i$ are the coordinates at the center of the photomultiplier tube; and
   X, Y are the estimated coordinates of the event.

5. The gamma camera system of claim 1 wherein the factor is comprised of a correction weight Wi per photomultiplier tube divided by the summation of the correction weights Wi.

6. The gamma camera of claim 5 wherein said corrected X, Y locations $X_c$, $Y_c$ are obtained from the equations:

$$X_c = \frac{\Sigma X_i W_i}{W}$$

$$Y_c = \frac{\Sigma Y_i W_i}{W}$$

where Wi is a correction factor for each of the PM's and W is the summation of $\Sigma W_i$.

7. The gamma camera of claim 6 wherein the correction factor $W_i$ per photomultiplier tube is equal to the energy expectation value $a_i$ multiplied by the differential of an event location optimization function M multiplied by the differential of the natural log of the expectation value with respect to the hypotenuse distance U between the photomultiplier tube and the scintillation.

8. The gamma camera of claim 5 wherein the correction factor $W_i$ per photomultiplier tube is equal to the energy per photomultiplier tubes Zi divided by the summation $\Sigma Zi$ minus the expectation value ai of the normalized energy per photomultiplier tube multiplied by the differential of the log natural of the expectation value ai with respect to the hypotenuse distance U between the center of the photomultiplier tube and the scintillation.

9. A gamma camera comprising:
a scintillation crystal providing an event which is a scintillation responsive to impingement on the crystal of radiation,
a plurality of photomultiplier tubes having approximately radially symmetrical PM-curves coupled to said crystal and operated responsive to said event for generating electrical signals,
an event location approximation operated responsive to said electrical signals for determining the approximate X, Y locations of the event and the energy Z of the event where X, Y are imaginary orthogonal coordinates on the scintillation crystal,
analytical apparatus using the approximate X, Y locations of the event relative to photomultiplier tube locations for analytically determining an expectation value ai of the energy output of each of the photomultiplier tubes responsive to said event based on the approximate locations of the photomultiplier tubes relative to the location of the event,
a correction factor computer that will optimize the correctness of the approximate X, Y locations of the events when said correction factors are used to modify the summation of the PM locations coordinates iteratively.

10. A corrected event location determination method in gamma cameras comprising the steps of:
scintillating responsive to impingement on the crystal of radiation to provide scintillation,
generating electrical signals responsive to said scintillation with a plurality of photomultipliers (PM's),
computing coordinate and hypotenuse distances of each of the PM's from each of the scintillations where the coordinates X, Y of the scintillations are estimated and the coordinates of the PM's Xi, Yi are known,
providing an energy expectation value $a_i$ for each PM based on the hypotenuse distance of the PM from the event as determined by the distance computer,
determining a factor to be applied to the summation of the coordinates of PM's Xi, Yi for providing corrected X, Y coordinate locations of the scintillations, and
repeatedly using the last corrected X, Y coordinate locations of the scintillations in determining factors that provide corrected X, Y coordinates for the location of the scintillations that are more correct than the last corrected X, Y coordinate location.

11. The method of claim 10 including the step of obtaining system data for use in determining the factor from lookup tables.

12. The gamma camera system of claim 11 wherein said lookup tables include:
a first table that provides the coordinate positions $X_i$, $Y_i$ of each of said photomultipliers,
a second table that provides an expectation value of normalized energy for each of the photomultipliers, and
a third table that provides the differential with respect to the hypotenuse distance of the log natural of the expectation value of the normalized energy for each of the photomultipliers.

13. The gamma camera of claim 10 including the steps of determining the distance between each of the photomultipliers and the event using the equation:

$$U_i^2 = (X-X_i)^2 + (Y-Y_i)^2$$

where:
U is the distance between the event and the center of the photomultiplier tube;
$X_i$ and $Y_i$ are the coordinates at the center of the photomultiplier tube; and
X, Y are the estimated coordinates of the event.

14. The gamma camera system of claim 10 wherein the factor is comprised of a correction weight Wi for each of said photomultipliers divided by the summation of the correction weights Wi.

15. The gamma camera of claim 14 including the step of obtaining said corrected X, Y locations $X_c$, $Y_c$ from the equations:

$$X_c = \frac{\Sigma X_i W_i}{W}$$

$$Y_c = \frac{\Sigma Y_i W_i}{W}$$

where $W_i$ is a correction factor for each of the PM's and W is the summation $\Sigma W_i$.

16. The gamma camera of claim 15 including the step of obtaining correction factor Wi for each of the photomultipliers as being equal to an energy expectation value ai multiplied by differential of an event location optimization function M multiplied by the differential of the natural log of the expectation value with respect to the hypotenuse distance $U_i$ between said each of the photomultipliers and the scintillation.

17. The gamma camera of claim 14 including the step of obtaining the correction factor Wi for each of the photomultipliers as being equal to the energy $Z_i$ for each of the photomultipliers divided by the summation $\Sigma Z_i$ minus the expectation value $a_i$ of the normalized energy for each of the photomultipliers multiplied by the differential of the log natural of the expectation value ai with respect to the hypotenuse distance $U_i$ between the centers of each of the photomultipliers and the scintillation.

18. A method for obtaining correct location coordinates of the scintillation in a gamma camera comprising the steps of:

providing an event which is a scintillation responsive to impingement on a scintillating crystal of radiation, coupling a plurality of PM's having approximately radially symmetrical PM curves to said crystal and operated responsive to said event for generating electrical signals, determining the approximate X, Y locations of the event and the energy Z of the event responsive to the electrical signals where X, y are imaginary orthogonal coordinates on the scintillation crystal, analytically determining the expectation value ai of the energy of each of the PM's responsive to said event based on the approximate locations of the PM's relative to the location of the event, optimizing the correctness of the approximate X, Y locations of the events when said correction factors are used to modify the summation of the photomultipliers location coordinates iteratively.

* * * * *